April 18, 1933.   C. D. FAGAN ET AL   1,904,283
FLOW INDICATOR
Filed June 2, 1931   2 Sheets-Sheet 2

INVENTORS
Charles D. Fagan
Rehl W. Swank
BY Ramsey & Kent
their ATTORNEYS.

Patented Apr. 18, 1933

1,904,283

UNITED STATES PATENT OFFICE

CHARLES D. FAGAN, OF SHARON, AND REHL W. SWANK, OF SHARPSVILLE, PENNSYLVANIA, ASSIGNORS TO SHARPSVILLE BOILER WORKS CO., OF SHARPSVILLE, PENNSYLVANIA, A CORPORATION OF PENNSYLVANIA

FLOW INDICATOR

Application filed June 2, 1931. Serial No. 541,628.

The present invention relates to improvements in liquid flow indicator and more especially to a device for indicating the flow of gasoline or the like in the dispensing apparatus for service stations.

Heretofore in the art, a common form of flow indicator has comprised a device having flat plate glass windows, with a spinning device visible through the flat windows from a narrow range of visibility. In the flat window device, the rotor or spinner is visible only to a person standing at such angle as to be able to look into the flat window. Furthermore, in devices of this kind, the spinner is necessarily small and does not afford such a clear precise indication as is extremely desirable. Also, the indicator may be rotated at a very high speed and thereby have an appearance somewhat the same as if the spinner were stationary. And further flat windows are not well adapted to withstand the high internal pressures that often occur in the use of the device.

The present invention overcomes the difficulties of the prior art by providing a relatively visual indicator so mounted as to be visible from any point around the device and the speed of the indicator is controlled by a retarding element in such manner as to cause the movement of the indicator to be clearly indicative of the flow of gasoline through the device. Furthermore, the indicator is so constructed as to change its degree of visibility during rotation, that is, the indicator preferably is a flat symbol which presents first an edge and then gradually moves to a full flat face presentation to the observer, thereby causing a pulsating visual succession which is unmistakable in its indication that gasoline is flowing through the device.

It is realized that the present invention may be embodied in constructions differing somewhat from those herewith shown and described, and, therefore, the present disclosure is to be as illustrative and not in the limiting sense.

Figure 1:
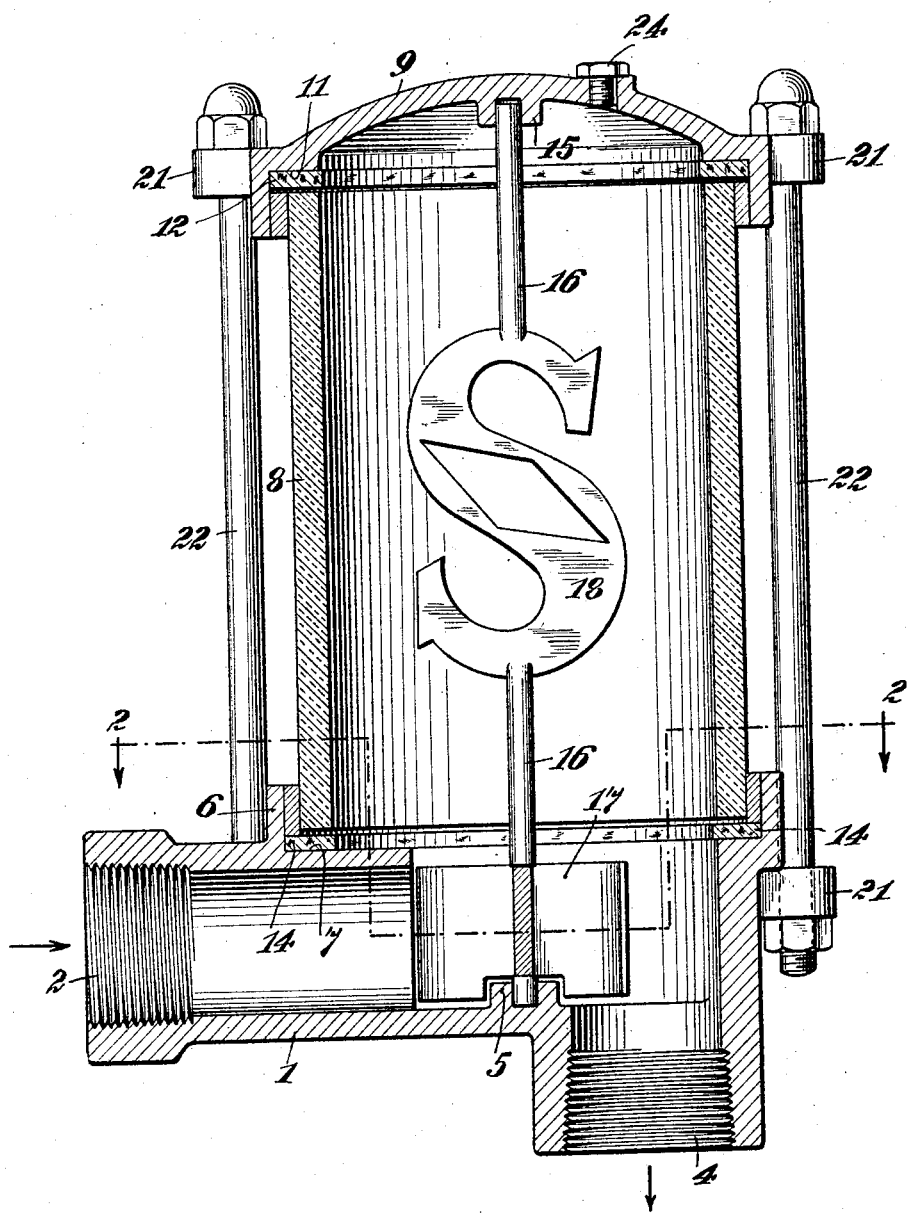
Fig. 1 is an elevational sectional view through the preferred form of the device.
Figure 2:
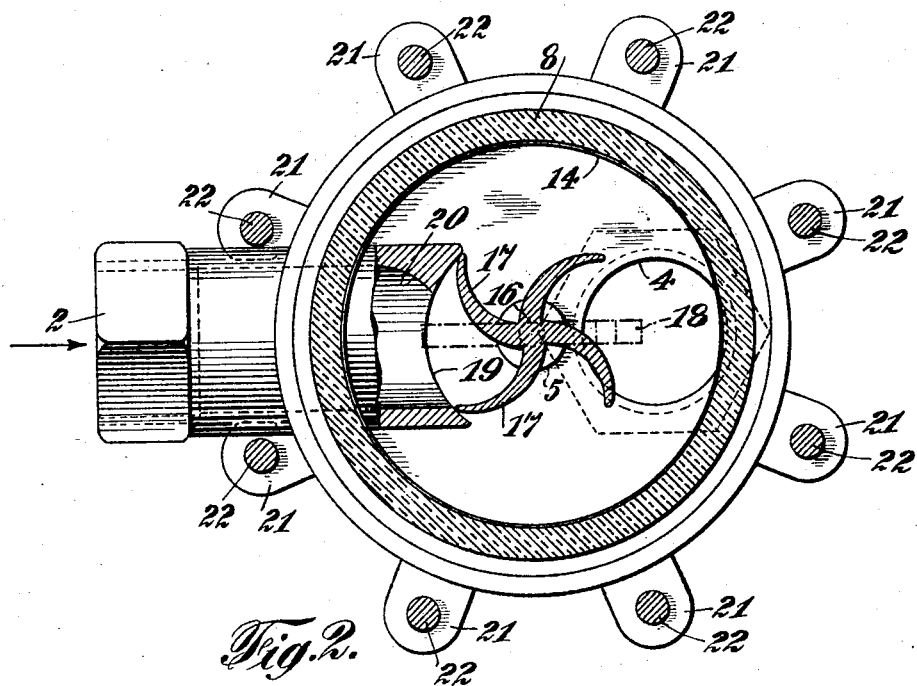
Fig. 2 is a plan sectional view taken on line 2—2 of Fig. 1.

Referring now to the drawings and more especially to Fig. 1, a preferred form of the device comprises a base member 1 comprising an inlet conduit 2 and an outlet conduit 4 with the axes of these conduits preferably at right angles to each other. A bearing boss 5 is provided in the base 1 adjacent the outlet conduit 4 and a circular flange 6 is provided adjacent a circular seat 7 to support the lower end of a transparent cylinder 8, preferably, a cylinder of heavy walled glass. A cap member 9 is provided with a circular flange 10 and a circular seat 11 to enclose and receive the upper end of the cylinder 8. Suitable gaskets 12 and 14 are adapted to seal the ends of the cylinder 8 against the base member 1 and the cap member 9 respectively. The cap member 9 is provided in its central inner portion with a bearing boss 15 which is aligned with the bearing boss 5 in the base member 1. A shaft 16 has its ends seated in the bearing bosses 5 and 15 in such manner as to be rotatable in these bearings. The lower end of the shaft 16 carries a rotor 17 of a small liquid turbine and the center of the shaft carries an indicator 18 preferably comprising a flat symbol of sheet-like material which is adapted to act to retard the normal speed of the rotor 17 as will be hereinafter explained.

The inlet conduit 2 has its inner end 19 cut away in such manner as to afford a clearance for the ends of the blades of the rotor 17 and one side wall at the end 19 of the conduit 2 is provided with an inward curve 20 to direct the flow of gasoline against the blades of the rotor 17 to cause the same to rotate when gasoline is flowing through the device.

The base member 1 and cap member 9 preferably comprise die castings and are each provided with brackets 21 having openings through which bolts 22 may extend to tightly clamp the cap member and base member against the ends of the transparent cylinder 8 to compress the gaskets 12 and 14 and form liquid tight joints. The space between the circular flange 6 in the base and the circular flange 10 in the cap is packed with packing material to form supports for the side wall of the transparent glass cylinder. A vent screw 24 is provided in the cap member 9 so that by loosening the vent screw when the device is first placed in service, the chamber within the transparent cylinder 8 fills with gasoline and then the vent screw is tightly screwed in place, thereby sealing the chamber full of gasoline.

Figure 3:
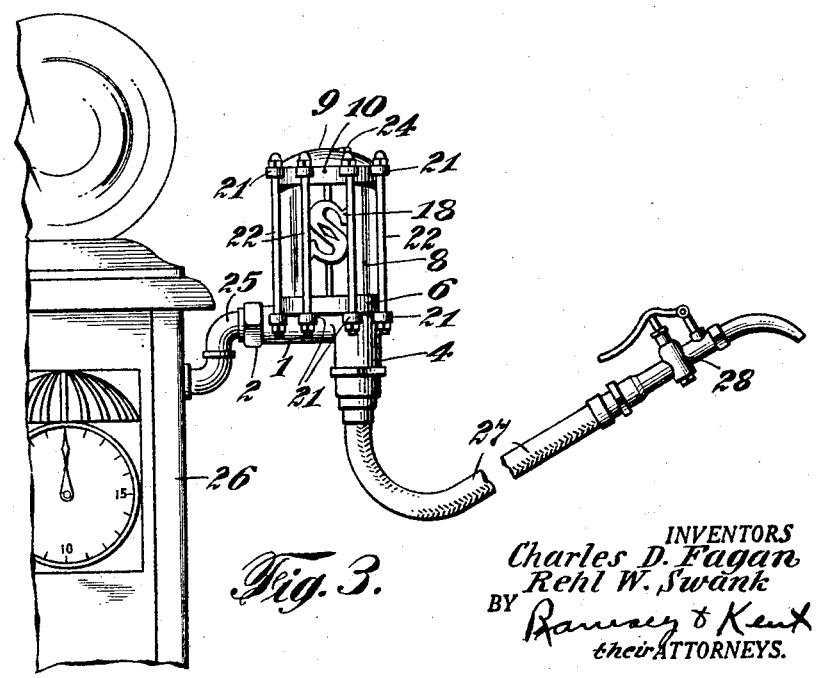
Fig. 3 is a detail view illustrating the mounting of the device relatively to a dispensing cabinet.

The device is adapted to be mounted upon the outlet conduit 25 and a dispensing cabinet 26, as shown in Fig. 3, in such manner as to be easily visible from various angles about the dispensing cabinet. The outlet conduit 4 of the device is connected with a dispensing hose 27 having therein a dispensing valve 28. The opening through the dispensing valve 28 plus the friction in the dispensing hose is such as to cause a slight pressure to exist during the flow of gasoline in the chamber within the circular cylinder 8 so that there is no danger of drawing out the gasoline from this chamber during the dispensing operation and thus producing a vacuum. However, if the liquid in the chamber 28 is slightly drawn down, the device operates satisfactorily in view of the fact that the rotor 17 is at all times in the flow of gasoline between the inlet 2 and the outlet 4 from the device.

In devices of this kind, it frequently happens that very substantial pressures are built up where gasoline is trapped in the dispensing hose when the dispensing nozzle is closed and the gasoline is permitted to expand due to the sun's rays heating the several conduits. The present requirements are that a device of this character shall withstand a pressure of three hundred pounds per square inch without rupture, and the present device is designed in such manner as to withstand this heavy stress without in any way interfering with the operation of the rotating parts. Any tendency to expand the parts due to pressure or heat does not bind or disalign the rotating parts and does not interfere with the free rotation of the rotor and the indicator.

The indicator 18 rotates in a bath of the liquid which is being dispensed and the resistance of this flat indicator member due to its rotating in the liquid slows up the speed at which the rotor normally would rotate. However, the rotor is so constructed as to receive a powerful impulse when the gasoline is flowing, and this powerful impulse assures sufficient reserve power to at all times rotate the indicator when flow of liquid takes place. The indicator being flat and preferably comprising a symbol designating the character of gasoline being sold has two valuable characteristics. First, its visual component from an edge view to a full flat view is such as to attract the attention of the purchaser and thereby clearly show that gasoline is flowing and at the same time calls the purchaser's attention the particular symbol, thereby indicating that he is obtaining the kind of gasoline which he desires, and which kind is designated by the said indicator symbol.

The visual feature of this device is further facilitated by the operation of the motor, in that a large portion of the rotor revolves over the outlet conduit through which liquid is flowing substantially parallel to the axis of the rotor. A fast flow of liquid into the mouth of the outlet conduit sets up a resistance to the rotation of the rotor which compensates for the tendency of a fast flow of liquid through the inlet conduit to cause the rotor to run at a high speed. This action tends to cause the symbol to be rotated at a substantially uniform speed under varying conditions of liquid flow.

What we claim is:—

1. A flow indicator comprising a transparent walled chamber, a shaft extending into said chamber, a substantially flat advertising symbol visually mounted on said shaft with the axis of said shaft extending through the axis of said symbol, a bladed rotor mounted on said shaft, an inlet conduit to direct liquid against the blades of said rotor in a direction substantially at right angles to the axis of the rotor to cause said rotor to rotate when liquid is flowing from said inlet conduit, and an outlet conduit having an axis substantially parallel to the axis of rotation of the rotor and with the blades of said rotor moving in a path directly over the mouth of said outlet conduit so that an increased flow of liquid into said outlet conduit increases the resistance to the rotation of said rotor to compensate for the tendency of said rotor to speed up under increased flow of liquid through said device, said transparent walled chamber being in free communication with said inlet and outlet conduits.

2. In a flow indicator, the combination of a transparent chamber, an advertising symbol visually mounted in said chamber and being adapted to be rotated on the axis of said symbol, means whereby liquid may be flowed through said chamber, rotor means operated by the flow of said liquid to rotate said symbol, and means independent of said symbol to retard the speed of rotation of said rotor member when the flow of liquid through said device is increased.

CHARLES D. FAGAN.
REHL W. SWANK.